United States Patent [19]

Moon

[11] 3,726,262

[45] Apr. 10, 1973

[54] ENGINE COOLING SYSTEM

[75] Inventor: Charles L. Moon, Brecksville, Ohio

[73] Assignee: White Motor Corporation, Cleveland, Ohio

[22] Filed: Dec. 9, 1970

[21] Appl. No.: 96,302

[52] U.S. Cl. ............ 123/41.1, 123/41.01, 123/41.54, 165/119, 210/DIG. 17
[51] Int. Cl. .................................................. F28f 19/00
[58] Field of Search .................. 123/41.04, 41.01, 123/41.21, 41.42, 41.1, 41.08, 41.54; 210/DIG. 17, 235; 165/119

[56] References Cited

UNITED STATES PATENTS

| 3,540,528 | 11/1970 | Moon | 123/41.01 |
| 3,040,894 | 6/1962 | Pall | 210/235 |
| 2,932,400 | 4/1960 | Scavuzzo | 210/235 |
| 2,978,107 | 4/1961 | Gutkowski | 210/235 |
| 1,987,847 | 1/1935 | Flood | 165/119 |
| 1,715,492 | 6/1929 | Bassion | 123/41.01 |
| 3,623,462 | 11/1971 | Anders et al. | 123/41.54 |

Primary Examiner—Carlton R. Croyle
Assistant Examiner—Warren Olsen
Attorney—Watts, Hoffmann, Fisher & Heinke

[57] ABSTRACT

A cooling system for an internal combustion engine includes a coolant treatment system connected in a coolant degassing line between the engine and a coolant tank in the system. The coolant treatment system includes a throw-away filter and when the filter has been removed or is clogged, flow through the degassing conduit to the tank is uninterrupted.

13 Claims, 4 Drawing Figures

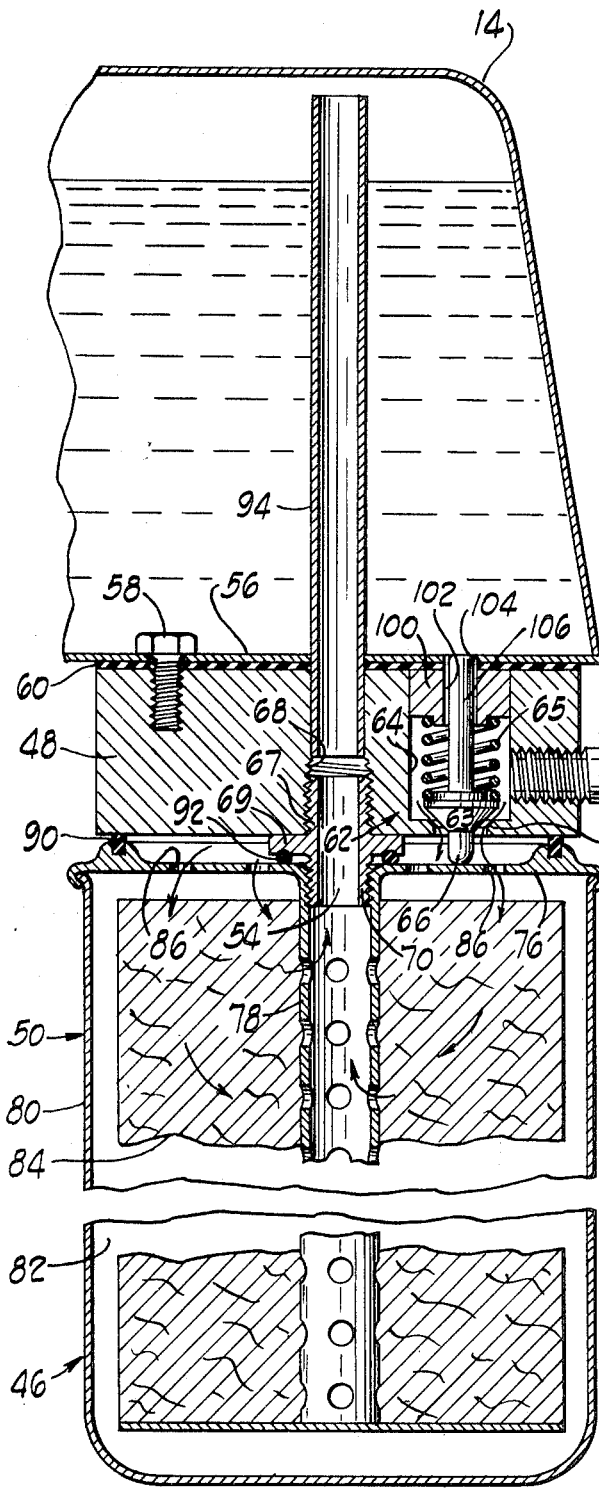
Fig. 2
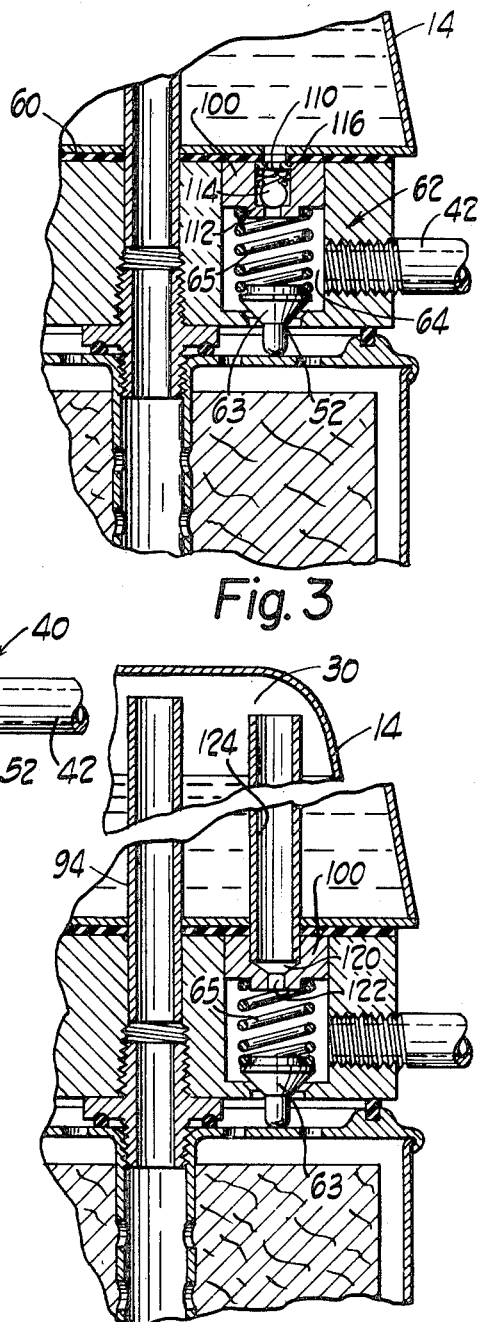
Fig. 3
Fig. 4
INVENTOR.
CHARLES L. MOON
BY Watts, Hoffmann, Fisher & Heinke
ATTORNEYS.

ENGINE COOLING SYSTEM

BACKGROUND OF THE INVENTION

1. Field of the Invention

The present invention relates to liquid cooled internal combustion engines and more particularly relates to apparatus for treating coolant in an internal combustion engine cooling system.

The maintenance of clean cooling systems is desirable in all automotive vehicles; however, in highway trucks and tractors the maintenance of clean, deposit-free cooling systems is particularly desirable since more reliable and efficient truck operation results. This is particularly the case with relatively high speed, heavy load and long distance operations to which modern truck vehicles are subjected.

After periods of sustained engine operation, foreign material is entrained in the engine coolant and can accumulate in engine coolant passages unless steps are taken to prevent it from doing so. Such foreign material may, for example, be in the form of rust or scale from the walls of various coolant passages in the cooling system, and minerals which can be deposited in the cooling system passageways when "hard" water forms a part of the coolant. If foreign material is not removed from the coolant, accumulations will inevitably build up in the coolant passageways giving rise to the possibility that the passageways can become blocked or that the amount of heat transferred to the coolant is reduced by the presence of the foreign material.

Increasing compression ratios and use of progressively higher energy fuels has increased the amount of heat required to be dissipated by internal combustion engine cooling systems. As a result, pressurized cooling systems have become nearly universal since these systems maintain the coolant in a liquid state over greater temperature ranges than do unpressurized systems. This assures a high coolant heat capacity.

In pressurized cooling systems, some of the coolant is sometimes flashed into the gaseous state just after the engine is stopped. This occurs adjacent engine hot spots when the coolant stops circulating. Flashing causes abrupt increases in coolant volume and pressure as well as surging in the coolant in the system. Accordingly, most systems employ accumulators, or surge tanks, and associated coolant degassing arrangements which accommodate coolant flashing as well as thermal expansion and contraction.

2. The Prior Art

Prior art proposals for engine coolant treatment systems have customarily comprised units which are separate from the conventional engine or radiator. These systems have required elaborate tanks, hoses, and valves which take up space in the engine compartment as well as requiring additional maintenance. Servicing these systems, for example, replacing a filter, was difficult because of relatively crowded and inconvenient locations of the components. Furthermore, it was necessary to close valves in inlet and outlet lines prior to servicing the filter so that coolant loss upon removal of the filter did not occur. If the valves were closed but not reopened, the filter was either "cut out" of the system or the system itself was blocked.

Some of the problems referred to were overcome by providing coolant treatment arrangements, such as filters, in a coolant surge tank of the system. These systems represented a marked improvement over the previously proposed systems, however, opening the system to atmosphere and dismantling parts associated with the surge tank was required in order to service the filters or treatment media. Furthermore, it was frequently desirable to clean parts of the treatment system before reinserting them into the system.

SUMMARY OF THE INVENTION

The present invention provides a new internal combustion engine cooling system having a coolant treatment system in which a coolant treatment media, such as a filter media, is removable for replacement without loss of coolant or dismantling or cleaning any other part of the system, and wherein operation of the system is unimpaired if the filter is blocked.

In a preferred embodiment, the cooling system includes a radiator, a coolant circulating pump directing coolant into the engine and a coolant tank. A coolant degassing conduit is connected between the engine and the tank. The coolant treatment media is associated with the coolant tank and the degassing conduit.

The coolant treatment system comprises a support base and a filter body removably connected to the support base for replacement without coolant loss. The support base defines filter inlet and filter outlet ports through which coolant flows into and out of the filter body. A valve is carried by the base for closing the filter inlet port when the filter body is removed from the base. The filter outlet port communicates with the coolant tank via a tube which opens above the tank coolant level. Hence, removal of the filter body from the base is not accompanied by coolant leakage.

The filter body is formed by a sealed, throw-away unit. The filter body is preferably screwed onto the support base and when screwed to its operative position the inlet port valve is forced open to enable flow through the filter body. When the filter body is unscrewed the valve recloses.

The support base is attached to the exterior of the coolant tank. The filter body projects from the support base outside of the tank and is accessible to the serviceman who merely unscrews the used filter body from the support base, discards the used filter body and screws a replacement filter body onto the base. The cooling system need not be opened or even partially dismantled during this procedure and cleaning sludge or other accumulated material is completely eliminated.

If coolant flow through the filter inlet port is blocked, flow through the degassing conduit to the tank continues. For this purpose the support base includes a controlled flow passage from the degassing conduit to the tank around the filter inlet port and the filter valve.

The controlled flow passage is preferably always open to flow but provides a sufficiently large pressure drop that substantial flows through the filter body are maintained. If desired, the controlled flow passage can house a normally closed check valve or the like, which opens the passage when flow through the filer ports is blocked.

A principal object of the present invention is the provision of a new and improved coolant treatment system for a cooling system of an internal combustion engine which is quickly and easily serviced without dismantling or opening any part of the cooling system and which, when clogged, does not interfere with the operation of the cooling system.

Other objects and advantages of the present invention will become apparent from the following detailed description made with reference to the accompanying drawings which form a part of the specification.

BRIEF DESCRIPTION OF THE DRAWINGS

FIG. 2 is a cross sectional view of part of the system shown in FIG. 1;

FIG. 3 is a cross sectional view similar to FIG. 2 showing a portion of an alternate construction;

FIG. 4 is a cross sectional view of part of another alternate construction.

DESCRIPTION OF PREFERRED EMBODIMENTS

Figure 1:
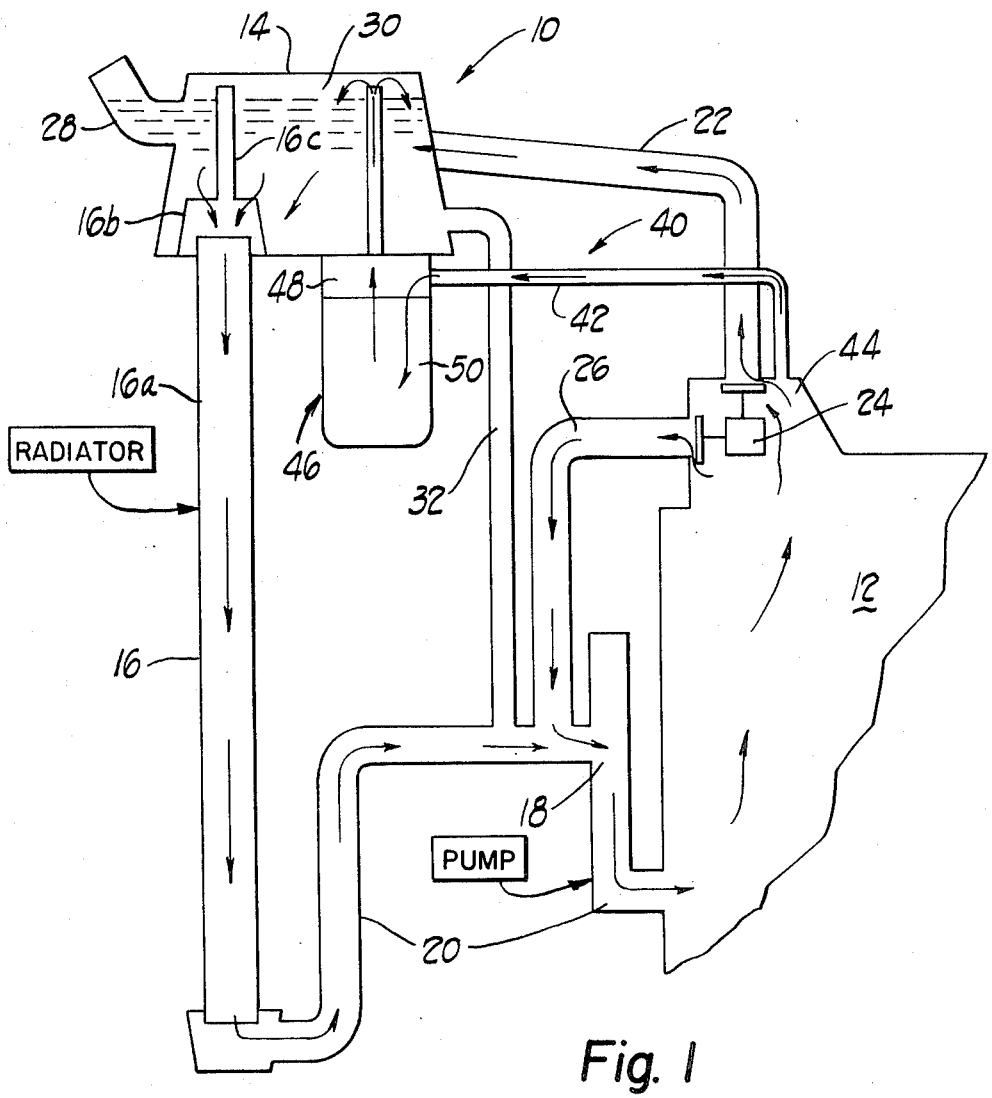
FIG. 1 is a schematic representation of a cooling system embodying the present invention.

A cooling system 10 embodying the present invention is illustrated in FIG. 1. The system 10 includes an engine 12, a coolant tank 14, a radiator core assembly 16 and a cooling circulating pump 18 which is connected in a conduit 20 between the radiator and the engine 12. The system directs coolant through the conduit 20 into the engine 12, through coolant passageways formed in the engine block (not shown in detail), and to the coolant tank 14 and radiator core 16 through a conduit 22.

The flow path of coolant in the system 10 is controlled by a thermostatic valve 24 according to the coolant temperature as it leaves the engine. The thermostatic valve 24 is supported in the coolant outlet section of the engine adjacent the conduit 22 and the bypass conduit 26. When the coolant temperature is relatively low, for example when the engine is just started up, the thermostatic valve 24 blocks the conduit 22 and opens the bypass conduit 26 so that the coolant flowing in the engine 12 is circulated from the pump 18 through the engine past the thermostatic valve 24 and to the pump inlet through the bypass conduit 26. This provides for rapid engine warm-up. As the coolant temperature increases, the valve 24 gradually closes the bypass conduit 26 while opening the coolant conduit 22 so that coolant flows in both branches for a time. When the coolant temperature at the outlet section of the engine has reached a predetermined temperature level, the thermostatic valve 24 closes the bypass conduit 26 so that all of the flow in the system passes through the conduit 22 to the radiator core assembly.

The coolant tank 14 functions as (1) a surge tank to accommodate abrupt changes in coolant volume; (2) a coolant reservoir; and (3) an accumulator which compensates for thermal expansion and contraction of the coolant. The tank 14 extends along the top of the radiator core assembly and includes a fill spout 28 projecting from a side wall of the tank. The fill spout is closed by a suitable pressure cap (not illustrated). The fill spout 28 opens into the tank well below the top wall so that when the tank is filled, an air space 30 extends along the inside of the tank above the coolant. The coolant system 10 is preferably under pressure when the engine operates so that the air in the space 30 has a pressure which is a few pounds per square inch greater than atmospheric pressure yet is compressible to accommodate coolant surging and/or thermally created volume changes. While the tank 14 is illustrated as being integral with the radiator core assembly, the tank can be separated from the radiator core assembly if desirable.

A static coolant conduit 32 extends from the tank 14 to the conduit 20 adjacent the pump inlet so that coolant is supplied from the tank 14 to the pump if the pump inlet pressure becomes unduly low.

A radiator degassing arrangement is provided between the radiator and the tank 14 so that gas in the radiator is vented to the air space 30. As shown in FIG. 1, the top 16a of the radiator core is provided with a baffle 16b which provides for coolant flow into the core assembly 16. A radiator degassing tube 16c extends upwardly from the baffle 16b into the air space 30. Any gas or vapor passing into the baffle 16b is directed upwardly to the top of the tank 14 through the tube 16c.

According to the present invention, a coolant treatment system 40 is incorporated in the coolant system 10. The new coolant treatment system 40 preferably filters and degasses the coolant flowing from the engine to the tank 14. The system 40 includes a degassing conduit 42 which communicates a coolant outlet section 44 of the engine 12 with the tank 14 through a filter unit 46.

Referring to FIG. 2, the filter unit 46 is connected to the tank 14 and includes a filter base 48 supporting a replaceable filter body 50. The filter body 50 is detachably connected to the base and is readily removed for replaceMent without loss of coolant from the system. The filter base is constructed so that degassing of the engine coolant is uninterrupted if flow through the filter body 50 is prevented for any reason.

The filter base 48 is fixed to the tank 14 and defines a filter inlet port 52 communicating the conduit 42 with the filter body 50, and a filter outlet port 54 communicating the filter body 50 with the tank 14. The conduit 42 is firmly attached to the filter base. As is best seen in FIG. 2, the filter base 48 is attached to the bottom tank wall 56 by screws 58 which extend through the wall 56 and into the filter base. A gasket 60 is interposed between the bottom tank wall 56 and the filter base to insure against coolant leakage between these parts.

Coolant flows to the filter body from the degassing conduit 42 through a valve 62 in the filter base. The valve 62 cuts off the coolant flow when the filter body 50 is removed from the base. The valve 62 includes a valve body 63 which is disposed in a valve chamber 64 formed by the filter base. The valve body 63 is biased to seat over the filter inlet port 52 by a spring 65. When the valve body 63 seats over the filter inlet port, coolant flow through the filter body 50 is blocked.

The valve body is maintained in its open position when the filter body 50 is supported on the filter base. A pin 66 projects from the valve body 63 through the inlet port 52. The pin is engaged by the filter body 50 and when the filter body is in position on the base 48 the valve body 63 is lifted away from the port 52 against the biasing spring 65.

The filter body is connected to the filter base 48 by a tubular flanged connector 67 which defines the filter outlet port 54. The tube 67 has external threads enabling it to be screwed into a tapped hole 68 in the base. A flange 69 surrounds the tube 67 and engages the base 48 when the tube 67 is screwed into the hole 68. An externally threaded tube end 70 projects from the flange 69 for reception of the filter body which is screwed onto the tube end 70.

The filter body is preferably a discardable canister-like assembly which is screwed onto and off of the base quickly and without leakage of coolant from the cooling system. The filter body includes a sheet metal base plate 76 having an integral perforate center tube 78 projecting downwardly from the tank 14 away from the base plate. A cup-like cover 80 is attached to the base plate 76 to define a chamber 82 within the filter body. A filter element 84 is disposed within the chamber.

The filter element 84 is preferably an annular member which surrounds the tube 78 so that coolant flowing into the filter body must pass through the filter element before flowing to the tank 14. The filter element can be in the form of a water softening media if desired or such a media can be enclosed in the filter body 50 along with a filter element.

The juncture of the filter base 48 and filter body 50 is a manifold-like chamber through which coolant flows into the filter body. The base plate 76 is formed with a plurality of inlet openings 86 disposed circumferentially about it. The openings 86 are formed between spaced apart annular seals 90, 92 which are disposed between the filter base and the filter body. The seal 90 is seated in a circumferential groove in the plate 76 radially outwardly of the openings 86. The seal 92 is an O-ring seal which is fixed to the flange 69 and surrounds the tube 67.

Filtered coolant flows from the filter body to the tank 14 through the tube 67. As shown in FIG. 2, an Outlet tube 94 is fixed in the filter base coaxially with the tube 67 and extends through the coolant in the tank 14 to the air space 30. The filter outlet thus delivers coolant from the filter body into the air space 30 above the coolant level in the tank 14.

When the filter body 50 is removed from the filter base 48 the valve 62 is biased closed to prevent coolant flow through the filter inlet port 52. The outlet tube 94 extends above the level of the coolant in the tank 14 and accordingly the leakage of coolant from the tank 14 through the filter outlet port 54 is prevented.

In the preferred embodiment of the invention, the filter base is provided with structure for enabling degassing the engine coolant when flow through the inlet port 52 is blocked. As is seen in FIG. 2, the valve chamber 64 is provided with a spring seat member 100 which is fixed in the filter base 48 and abuts the gasket 60. A guide hole 102 extends through the spring seat member 100 and communicates with the interior of the tank 14 via a hole 104 in the bottom tank wall aligned with a guide hole. A cylindrical valve stem 106 is formed integrally with the valve body 63 and extends through the guide hole 102 and the tank hole 104. The holes 102, 104 are of larger diametrical extent than the stem 106 and thus allow a controlled flow of coolant from the chamber 64 into the tank 14. The clearance between the valve stem and the surrounding guide hole is sufficiently small that flow impedance through the guide hole is high. Hence the major portion of flow through the degassing conduit passes through the filter.

FIG. 3 shows a modified filter base in which the valve stem is omitted from the valve 62 and the spring seat member 100 is provided with a through opening 110 extending to the tank 14. A check valve 112 is located in the opening 110. The check valve 112 includes a check ball 114 and a biasing spring 116. The ball 114 is biased to close the opening 110 and prevent flow from the tank to the filter base. When the pressure in the chamber 64 increases to a predetermined pressure which would not normally exist when the filter unit is operating properly the check ball 114 moves off its seat to enable flow through the spring seat member 110 and into the tank 14.

FIG. 4 shows another alternate construction in which the spring seat member 100 is formed with an opening 120 defined in part by an orifice 122 and a tube 124. The tube 124 extends upwardly into the tank airspace 30. The orifice provides a controlled flow of fluid into the tank from the filter base and produces a sufficiently high pressure drop that the filter unit is not bypassed unless it is clogged or otherwise blocked.

It can now be seen that the object set forth and others have been accomplished and there has been provided a new and imprOved filter for an engine cooling system. While several embodiments have been illustrated and described in detail the invention is not to be considered limited to the precise constructions shown. It is the intention to cover all adaptations, modifications and uses of the inVention which come Within the scope of the appended claims.

What is claimed is:

1. A cooling system for an internal combustion engine comprising a radiator core assembly, a pump for circulating coolant through the engine and the radiator core assembly, a coolant tank and a coolant treatment system comprising:
    a. a degassing conduit between said engine and said tank;
    b. a coolant filter unit comprising a filter base connected to said tank and said conduit and a filter body detachably connected to said filter base, said base having a filter inlet port communicating said conduit with said filter body and an outlet port communicating said filter body with said tank;
    c. a valve in said base between said filter inlet port and said conduit for terminating coolant flow through said filter inlet port when said filter body is detached from said base to prevent leakage of coolant from said cooling system through said filter inlet;
    d. structure defining a controlled flow passageway from said conduit to said tank in parallel with said valve and said filter body for venting said conduit when coolant flow through said filter inlet passage is impeded; and,
    e. passageway means between said filter outlet port and said tank, said passageway means opening into said tank above the normal level of coolant therein for preventing the flow of coolant from said tank through said filter outlet port when said filter body is detached from said base.

2. A cooling system as claimed in claim 1 wherein said valve comprises a valve chamber defined by said base and a valve member in said chamber, said controlled flow passageway defined in part by a flow restricting orifice communicating said valve chamber with said tank and further including a tube connected to said base adjacent said orifice and extending into said tank to a location above the coolant level in said tank whereby fluid vented through said orifice and said tube enters said tank above the level of coolant therein.

3. A cooling system as claimed in claim 1 wherein said controlled flow passageway supports a check valve which normally closes said passageway, said check valve opening to provide for flow through said passageway when pressure in said conduit increases a predetermined amount above the pressure in said tank.

4. A cooling system as claimed in claim 1 wherein said valve comprises a valve chamber defined by said base and a valve member movable in said chamber to open and close said filter inlet port, said valve member including a projection extending through said inlet port, said filter body engaging said projection when connected to said base and maintaining said valve member in its open position.

5. A cooling system as claimed in claim 4 wherein said valve further includes a biasing spring in said chamber for urging said valve member toward its closed position, and a spring seat against which said spring reacts, said spring seat defining a chamber wall through which said controlled flow passageway extends.

6. A cooling system for an internal combustion engine comprising a radiator core assembly, a pump for circulating coolant through the engine and the radiator core assembly, a coolant tank and a coolant treatment system comprising:
   a. a degassing conduit between said engine and said tank
   b. a coolant filter unit comprising a filter base connected to said tank and said conduit and a filter body detachably connected to said filter base, said base having a filter inlet port communicating said conduit with said filter body and an outlet port communicating said filter body with said tank;
   c. a valve in said base between said filter inlet port and said conduit for terminating coolant flow through said filter inlet port when said filter body is detached from said base to prevent leakage of coolant from said cooling system through said filter inlet;
   d. said valve comprising a valve member movable to open and close said filter inlet port and a valve stem extending from said Valve member into a guide hole, said controlled flow passageway defined in part by an annular space between said valve stem and the surrounding guide hole; and,
   e. structure defining a controlled flow passageway from said conduit to said tank in parallel with said valve and said filter body for venting said conduit when coolant flOw through said filter inlet passage is impeded.

7. A cooling system for an internal combustion engine comprising a radiator core assembly, a pump for circulating coolant through the engine and the radiator core assembly, a coolant tank and a coolant treatment system comprising:
   a. a degassing conduit between said engine and said tank;
   b. a coolant filter unit comprising a filter base connected to said tank and said conduit and a filter body detachably connected to said filter base, said base having a filter inlet port communicating said conduit with said filter body and an outlet port communicating said filter body with said tank;
   c. a valve in said base between said filter inlet port and said conduit for terminating coolant floW through said filter inlet port when said filter body is detached from said base to prevent leakage of coolant from said cooling system through said filter inlet;
   d. structure defining a controlled flow passageway from said conduit to said tank in parallel with said valve and said filter body for venting said conduit when coolant flow through said filter inlet passage is impeded; and,
   e. said valve comprising:
      i. a valve chamber defined by said base;
      ii. a valve member movably disposed in said chamber to open and close said filter inlet port;
      iii. a biasing spring in said chamber for urging said valve member toward its closed position;
      iv. a spring seat member attached to said base and against which said spring reacts;
      v. said spring seat member defining a chamber wall through which said controlled flow passageway extends, said controlled flow passageway extending through said spring seat member and an adjacent wall of said tank; and,
      vi. said member including a projection extending through said inlet port, said filter body engaging said projection when connected to said base and maintaining said valve member in its open position.

8. The system of claim 7 wherein said valve member further includes a stem projecting through a guide opening in said spring seat member, said flow passageway defined by the space between said valve stem and said guide opening.

9. The system claimed in claim 7 and further including a check valve disposed in said spring seat member for closing said flow passageway when pressure in said valve chamber is less than pressure in said tank.

10. A coolant filter for an internal combustion engine cooling system comprising a coolant tank and a conduit connected between the engine and said tank, said filter comprising:
   a. a filter base attached to said tank on an exterior wall thereof;
   b. a filter body detachably connected to said filter base and projecting from said filter base exteriorly of said tank;
   c. said filter base attached to said conduit and comprising:
      1. a filter inlet port communicable with said engine via said conduit; and,
      2. a filter outlet port communicating said filter body with said tank;
   d. valve means in said filter base for blocking coolant flow through said filter inlet port when said filter body is detached from said base; and,
   e. a tube member between said filter outlet port and said tank, said tube member opening into said tank above the normal level of coolant therein and effective to prevent flow from said tank through said filter outlet port when said filter body is detached from said base.

11. The filter claimed in claim 10 wherein said filter body is a discardable unit.

12. The filter claimed in claim 10 further including a flow passageway in said base between said conduit and said tank around said filter and said valve, said flow passageway impeding coolant flow around said filter.

13. The filter claimed In claim 10 wherein one of said filter ports is defined by a threaded tubular projection on said filter base, said filter body threaded onto said projection into fluid tight contact with said base.

* * * * *